United States Patent
Kumar et al.

(10) Patent No.: US 8,327,228 B2
(45) Date of Patent: Dec. 4, 2012

(54) HOME AGENT DATA AND MEMORY MANAGEMENT

(75) Inventors: Ganesh Kumar, Fort Collins, CO (US);
Dheemanth Nagaraj, Bangalore (IN);
Vincent R. Freytag, Windsor, CO (US);
Eric Delano, Fort Collins, CO (US);
Gregory S. Averill, Fort Collins, CO (US)

(73) Assignee: Intel Corporation, Santa Clara, CA (US)

( * ) Notice: Subject to any disclaimer, the term of this patent is extended or adjusted under 35 U.S.C. 154(b) by 523 days.

(21) Appl. No.: 12/571,381

(22) Filed: Sep. 30, 2009

(65) Prior Publication Data
US 2011/0078492 A1    Mar. 31, 2011

(51) Int. Cl.
*G11C 29/00* (2006.01)

(52) U.S. Cl. ........ 714/764; 714/4.2; 714/6.13; 714/723; 714/754; 714/765; 711/146; 711/148

(58) Field of Classification Search .................. None
See application file for complete search history.

(56) References Cited

U.S. PATENT DOCUMENTS

| | | | |
|---|---|---|---|
| 5,699,510 A | 12/1997 | Petersen et al. | |
| 5,832,306 A * | 11/1998 | Martin | 710/52 |
| 6,009,488 A | 12/1999 | Kavipurapu | |
| 6,035,436 A * | 3/2000 | Wu et al. | 714/797 |
| 6,349,368 B1 | 2/2002 | Arimilli et al. | |
| 6,401,174 B1 * | 6/2002 | Hagersten et al. | 711/147 |
| 6,536,000 B1 * | 3/2003 | Jackson et al. | 714/57 |
| 6,725,343 B2 * | 4/2004 | Barroso et al. | 711/145 |
| 7,475,321 B2 | 1/2009 | Gurumurthi et al. | |
| 7,600,080 B1 | 10/2009 | Bhattacharyya et al. | |
| 7,962,696 B2 | 6/2011 | Steely, Jr. et al. | |
| 2002/0124143 A1 | 9/2002 | Barroso et al. | |
| 2004/0008712 A1 | 1/2004 | Yoshimoto et al. | |
| 2005/0160230 A1 | 7/2005 | Doren et al. | |
| 2006/0212762 A1 * | 9/2006 | Zimmer et al. | 714/47 |
| 2007/0073856 A1 | 3/2007 | Tsien | |
| 2007/0244987 A1 | 10/2007 | Pedersen et al. | |
| 2008/0313495 A1 * | 12/2008 | Huff | 714/8 |
| 2009/0125788 A1 * | 5/2009 | Wheeler et al. | 714/764 |
| 2010/0293437 A1 * | 11/2010 | Gollub et al. | 714/763 |
| 2010/0332720 A1 * | 12/2010 | Chang et al. | 711/6 |

(Continued)

FOREIGN PATENT DOCUMENTS

CN    102033715 A    4/2011

(Continued)

OTHER PUBLICATIONS

International Search Report and Written Opinion Received for PCT Application No. PCT/US2010/048709, mailed on Jun. 1, 2011, 8 pages.
International Preliminary Report on Patentability Received for PCT Application No. PCT/US2010/048709, mailed on Apr. 12, 2012, 6 pages.

(Continued)

*Primary Examiner* — John Trimmings
(74) *Attorney, Agent, or Firm* — Caven & Aghevli LLC (57) ABSTRACT

Methods and apparatus relating to home agent data and memory management are described. In one embodiment, a scrubber logic corrects an error at a location in a memory corresponding to a target address by writing back the corrected version of data to the target location. In an embodiment, a map out logic maps out an index or way of a directory cache in response to a number of errors, corresponding to the directory cache, exceeding a threshold value. Other embodiments are also disclosed.

35 Claims, 7 Drawing Sheets

U.S. PATENT DOCUMENTS

| | | |
|---|---|---|
| 2010/0332767 A1 | 12/2010 | Kumar et al. |
| 2011/0078384 A1 | 3/2011 | Kumar et al. |

FOREIGN PATENT DOCUMENTS

| | | |
|---|---|---|
| CN | 102033817 A | 4/2011 |
| TW | 201124840 A1 | 7/2011 |
| TW | 201137612 A1 | 11/2011 |
| WO | 2004/008712 A1 | 1/2004 |
| WO | 2011/041047 A2 | 4/2011 |
| WO | 2011/041095 A2 | 4/2011 |
| WO | 2011/041047 A3 | 6/2011 |
| WO | 2011/041095 A3 | 7/2011 |

OTHER PUBLICATIONS

International Preliminary Report on Patentability Received for PCT Patent Application No. PCT/US2010/046658, mailed on Apr. 12, 2012, 6 pages.

International Search Report and Written Opinion Received for PCT Application No. PCT/US2010/046658, mailed on Apr. 28, 2011, 9 pages.

Office Action Received for the U.S. Appl. No. 12/492,280, mailed on Mar. 22, 2012, 17 pages.

Office Action Received for the U.S. Appl. No. 12/571,382, mailed on Dec. 12, 2011, 13 pages.

\* cited by examiner

HOME AGENT DATA AND MEMORY MANAGEMENT

FIELD

The present disclosure generally relates to the field of electronics. More particularly, an embodiment of the invention relates to home agent data and memory management.

BACKGROUND

Cache memory in computer systems may be kept coherent using a snoopy bus or a directory based protocol. In either case, a memory address is associated with a particular location in the system. This location is generally referred to as the "home node" of a memory address.

In a directory based protocol, processing/caching agents may send requests to a home node for access to a memory address with which a corresponding "home agent" is associated. Accordingly, performance of such computer systems may be directly dependent on how efficiently home agent data and/or memory is managed.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments.

Some embodiments discussed herein are generally related to scrubbing memory at a home agent, e.g., by using system addresses. The memory scrubbing may involve the detection and/or correction of errors in a memory device. As will be further discussed herein, e.g., with reference to FIGS. 3 and 4, the scrubbing may be performed as a demand scrub or a patrol scrub.

Additionally, in some embodiments, one or more poison status bits may be utilized to avoid or at least reduce the chance of signaling a fatal error upon first encountering an uncorrectable error. Further, an embodiment ensures that there is no silent corruption of memory data and/or that no corrupted data would be committed to non-volatile memory.

Furthermore, in one embodiment, an index/way out of the directory cache is dynamically mapped out. Generally, a directory cache (also referenced herein as "Dir$", which may be on the same integrated circuit die with a home agent in an embodiment) stores information about address(es) and corresponding owner, which may be stored by one or more agents in the system. For example, the cache may indicate which agents may be storing requested data associated with a given address and therefore is the owner of the data at that address. Accordingly, the directory is assumed to contain information about the caching status of a coherence unit (e.g., cache line or cache block or another portion of a memory or cache) in the system's caching agents, e.g., for the purpose of reducing the snoop traffic such as reducing or avoiding snoop broadcasting. Also, since the directory cache is maintained efficiently, design budget may be reduced through smaller directory cache(s).

Generally, cache memory in computing systems may be kept coherent using a snoopy bus or a directory based protocol. In either case, a system memory address may be associated with a particular location in the system. This location is generally referred to as the "home node" of the memory address. In a directory based protocol, processing/caching agents may send requests to the home node for access to a memory address with which a "home agent" is associated. Moreover, in distributed cache coherence protocols, caching agents may send requests to home agents which control coherent access to corresponding memory spaces. Home agents are, in turn, responsible for ensuring that the most recent copy of the requested data is returned to the requestor either from memory or a caching agent which owns the requested data. The home agent may also be responsible for invalidating copies of data at other caching agents if the request is for an exclusive copy, for example. For these purposes, a home agent generally may snoop every caching agent or rely on a directory to track a set of caching agents where data may reside.

Figure 1:
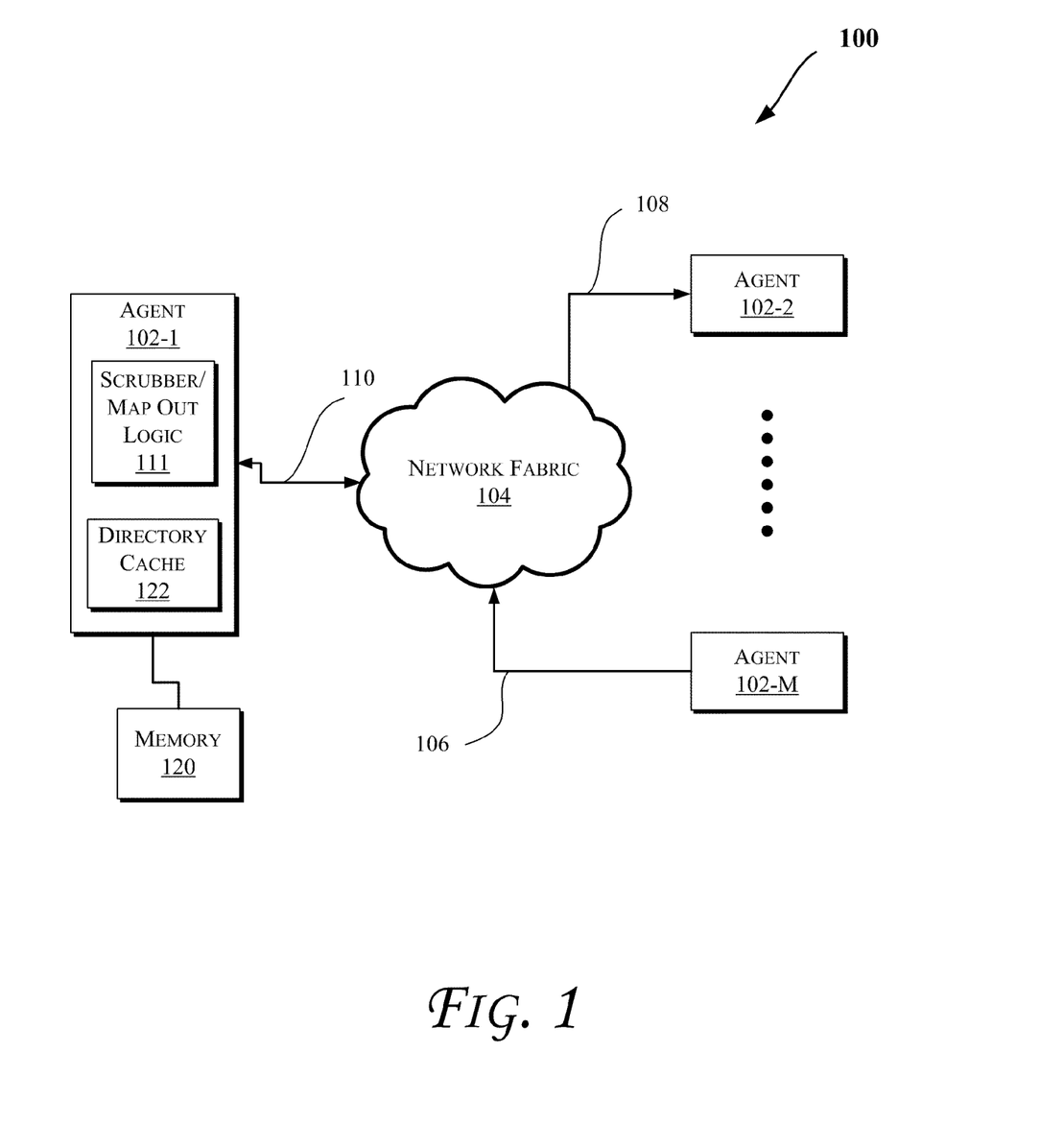
FIGS. 1-2 and 8-9 illustrate block diagrams of embodiments of computing systems, which may be utilized to implement various embodiments discussed herein.

Various computing systems may be used to implement embodiments, discussed herein, such as the systems discussed with reference to FIGS. 1 and 8-9. More particularly, FIG. 1 illustrates a block diagram of a computing system 100, according to an embodiment of the invention. The system 100 may include one or more agents 102-1 through 102-M (collectively referred to herein as "agents 102" or more generally "agent 102"). In an embodiment, one or more of the agents 102 may be any of components of a computing system, such as the computing systems discussed with reference to FIGS. 8-9.

As illustrated in FIG. 1, the agents 102 may communicate via a network fabric 104. In one embodiment, the network fabric 104 may include a computer network that allows various agents (such as computing devices) to communicate data. In an embodiment, the network fabric 104 may include one or more interconnects (or interconnection networks) that communicate via a serial (e.g., point-to-point) link and/or a shared communication network. For example, some embodiments may facilitate component debug or validation on links that allow communication with fully buffered dual in-line memory modules (FBD), e.g., where the FBD link is a serial link for coupling memory modules to a host controller device (such as a processor or memory hub). Debug information may be transmitted from the FBD channel host such that the debug information may be observed along the channel by channel traffic trace capture tools (such as one or more logic analyzers).

In one embodiment, the system 100 may support a layered protocol scheme, which may include a physical layer, a link layer, a routing layer, a transport layer, and/or a protocol layer. The fabric 104 may further facilitate transmission of data (e.g., in form of packets) from one protocol (e.g., caching processor or caching aware memory controller) to another protocol for a point-to-point or shared network. Also, in some embodiments, the network fabric 104 may provide communication that adheres to one or more cache coherent protocols.

Furthermore, as shown by the direction of arrows in FIG. 1, the agents 102 may transmit and/or receive data via the network fabric 104. Hence, some agents may utilize a unidirectional link while others may utilize a bidirectional link for communication. For instance, one or more agents (such as agent 102-M) may transmit data (e.g., via a unidirectional link 106), other agent(s) (such as agent 102-2) may receive data (e.g., via a unidirectional link 108), while some agent(s) (such as agent 102-1) may both transmit and receive data (e.g., via a bidirectional link 110).

Additionally, at least one of the agents 102 may be a home agent and one or more of the agents 102 may be requesting or caching agents as will be further discussed herein. As shown, at least one agent (only one shown for agent 102-1) may include or have access a scrubber or map out logic (or engine) 111 to, respectively, scrub errors in memory based on demand or patrol scrubbing (which will be further discussed herein, e.g., with reference to FIGS. 2-3) or map out portions of memory (e.g., portions such as line or entry of directory cache 122, as will be further discussed herein, e.g., with reference to FIG. 7). Further, in an embodiment, one or more of the agents 102 (only one shown for agent 102-1) may have access to a memory (which may be dedicated to the agent or shared with other agents) such as memory 120. Also, one or more of the agents 102 (only one shown for agent 102-1) may maintain entries in one or more storage devices (only one shown for agent 102-1, such as directory cache(s) 122, e.g., implemented as a table, queue, buffer, linked list, etc.) to track information about items stored/maintained by the agent 102-1 (as a home agent). In some embodiments, each or at least one of the agents 102 may be coupled to the memory 120 and/or a corresponding directory cache 122 that are either on the same die as the agent or otherwise accessible by the agent.

Figure 2:
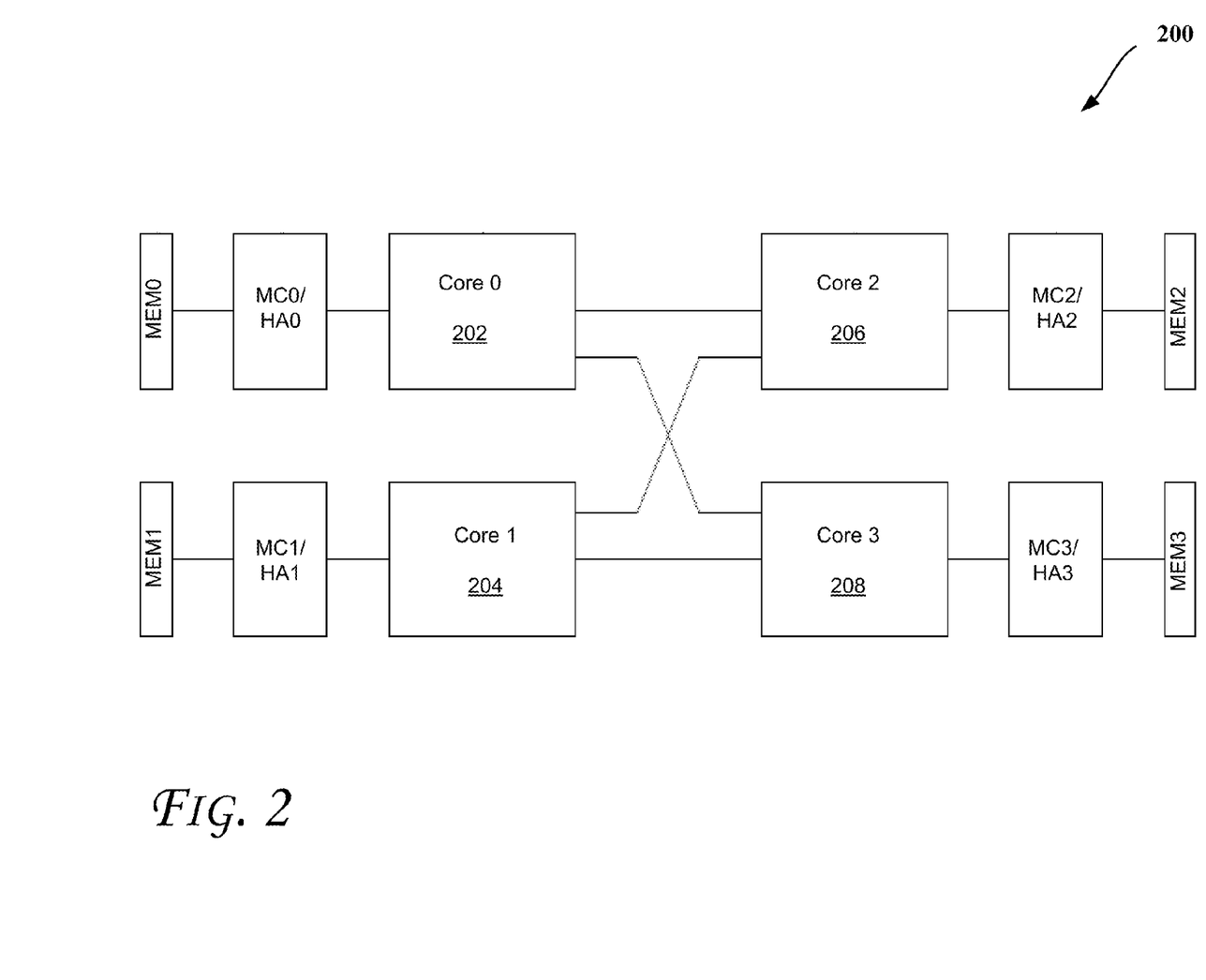

FIG. 2 is a block diagram of a computing system in accordance with an embodiment. System 200 may include a plurality of sockets 202-208 (four shown but some embodiments may have more or less socket). Each socket may include a processor in an embodiment. Also, each socket may be coupled to the other sockets via point-to-point (PtP) link such as discussed with reference FIG. 9. As discussed with respect to FIG. 1 with reference to the network fabric 104, each socket may be coupled to a local portion of system memory, e.g., formed of a plurality of Dual Inline Memory Modules (DIMMs) that may include dynamic random access memory (DRAM).

As shown in FIG. 2, each socket may be coupled to a memory controller (MC)/Home Agent (HA) (such as MC0/HA0 through MC3/HA3). The memory controllers may be coupled to a corresponding local memory (labeled as MEM0 through MEM3), which may be a portion of system memory (such as memory 912 of FIG. 9). In some embodiments, the memory controller (MC)/Home Agent (HA) (such as MC0/HA0 through MC3/HA3) may be the same or similar to agent 102-1 of FIG. 1 (e.g., including logic 111, etc.) and the memory, labeled as MEM0 through MEM3, may be the same or similar to memory 120 of FIG. 1. Also, in one embodiment, MEM0 through MEM3 may be configured to mirror data, e.g., as master and slave. Also, one or more components of system 200 may be included on the same integrated circuit die in some embodiments.

An implementation such as shown in FIG. 2 thus may be for a socket glueless configuration with mirroring. For example, data assigned to a memory controller (such as MCO/HA0) may be mirrored to another memory controller (such as MC3/HA3) over the PtP links. Also, the directory associated with memory controller MC3/HA3 may initialized in the unknown (U)-state upon a copy to mirror. Upon failover to this controller (e.g., due to an online service-call for this memory controller), the directory may be reconstructed from the U-state.

Figure 3:
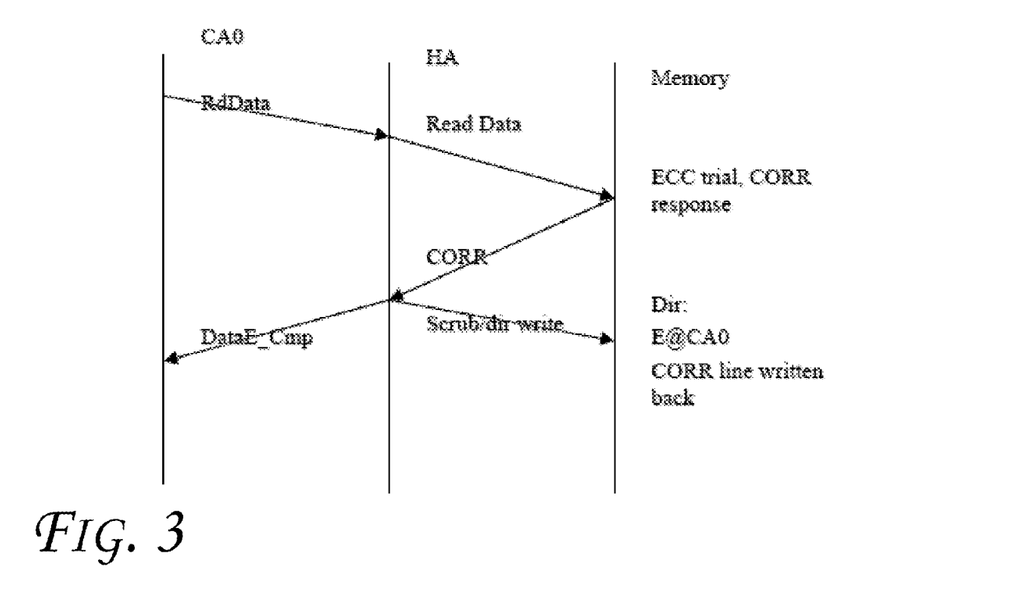
FIGS. 3-7 illustrate flow diagrams according to some embodiments.

FIG. 3 illustrates a flow diagram of demand scrub operation, according to an embodiment. Generally, demand scrubbing involves the pro-active clean up of correctable soft memory (e.g., DRAM or DIMM) errors encountered during normal operation. For example, on encountering a correctable error on a read operation, the memory controller may signal a correctable response to the home agent. The home agent may in turn ensure that the corrected data (e.g., stored in its buffers, which may be stored in the home agent or otherwise accessible by the home agent) is written back to memory (such as the memory 120 of FIG. 1 and/or MEM0-MEM3 of FIG. 3).

Referring to FIG. 3, "CA0" refers to caching agent (which may be one of the agents of FIG. 1 and/or one the components of FIG. 2 such as sockets 202-208 or MC0-MC3, depending on the implementation) and "HA" refers to home agent (which may be one of the agents of FIG. 1 and/or one the components of FIG. 2 such as MC0-MC3, depending on the implementation).

As shown, a RdData request (e.g., to read data) from CA0 results in a read operation to the memory controller (HA) to read data from the memory. This read results in a CORR (or corrected) response (e.g., indicating the memory controller ECC (Error Correction Code) logic successfully corrected the transient error in memory, e.g., in DIMMs). The HA returns the corrected data to the requestor CA0 (labeled "DataE_Cmp"indicating data error correction is completed). Also, separately or in the background, HA may launch a write operation to the memory (labeled as "Scrub/dir write"), where the write operation may both update the directory (e.g., directory 122 of FIG. 1), as well as write corrected data back to the memory which allows for subsequent read operation of the data to not incur the latency of an ECC correction pass.

Figure 4:
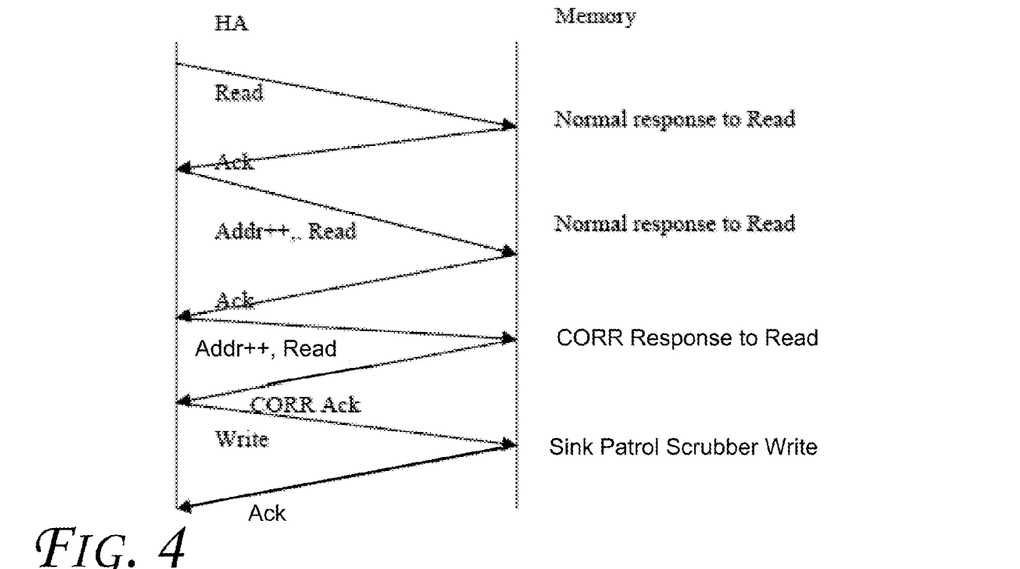

FIG. 4 illustrates a flow diagram of patrol scrub, according to an embodiment. Generally, the patrol scrubber proactively cleans up correctable soft memory (e.g., DRAM or DIMM) errors. In an embodiment, a patrol scrubber initiated memory read that encounters a correctable error will cause a memory write with corrected data.

Referring to FIG. 4, "HA" refers to home agent (which may be one of the agents of FIG. 1 and/or one the components of FIG. 2 such as MC0-MC3, depending on the implementation) and "Memory" refers to local or a memory coupled to and managed by HA (such as the memory 120 of FIG. 1 and/or MEM0-MEM3 of FIG. 3).

In one embodiment, the HA's logic 111 may be programmed with one or more of: an address range (e.g., for which the scrubbing or error detection/correction is to be performed), stride (e.g., indicating how to increment the address after performing a scrub operation), and interval (e.g., indicating how often a scrub operation must be performed).

As shown in FIG. 4, HA sends a read operation (e.g., the read operation is sourced by the HA, not a caching agent) to memory. A normal response to the read operation is acknowledged by memory (as indicated by "Ack" labels in FIG. 4). Also, the HA patrols the address range (indicated by the Addr++ label), reading data, and proactively writing any data that was corrected by the memory controller (e.g., as indicated by CORR) to memory. As a result, future read operations of the corrected data will not incur the latency of an ECC trial. More particularly, as shown in FIG. 4, HA issues a read to memory, receives an Ack, sends another read this time to the next address (as indicated by "Addr++"), receives a corresponding Ack, sends the next read to memory (which is corrected as indicated by the CORR label), receives CORR Ack, writes the corrected data to memory, and receives the acknowledge (Ack) (e.g., indicating that the scrub Write has finished).

In an embodiment, the patrol and demand scrub logics operate on the system addresses (e.g., such as Quick Path Interface (QPI) addresses) rather than compressed "device level" addresses. This implies that both the patrol and demand scrub engines may utilize the forward progress algorithm(s) implemented in a home agent. For the patrol scrubber, appropriate system address ranges that need to be scrubbed, the address increment or stride based on system interleave, and the scrub interval may be programmed in the home agent's registers (e.g., Control and Status Registers (CSRs)).

After the patrol scrubber has completed scrubbing or checking an address range, it may: (1) trigger an interrupt (such as a Platform Management Interrupt (PMI)), e.g., to alert Software Abstraction Layer (such as BIOS (Basic Input/Output System)) so that the BIOS may re-program HA registers in order to initiate patrol scrubbing of the next address range; or (2) set a completion bit which BIOS may poll to know when to initiate patrol scrubbing of the next address range.

As indicated above, the patrol scrubber may operate on a range of addresses programmed by software (e.g., BIOS). For each line (e.g., cache line) within this range, the scrubber launches a read to the memory controller. If the patrol scrubber receives a corrected response to the read operation, it issues a write to the same address. When performing the write operation, a user programmed value for the cache directory and poison-bit may be used as further discussed herein, e.g., with reference to FIG. 5 or 6. This feature may be useful to efficiently clear out poisoned data (including for example, data lines) in memory.

In accordance with an embodiment, the scrubber may operate in accordance with the following pseudo code:

hiAddr—high address of scrub range
loAddr—low address of scrub range
currAddr—scrubber is operating on currAddr
stride—currAddr is incremented by this amount after each scrub operation (e.g. an 8-way 128 B interleave would require this value to be set at 8×128, it would also require two passes (one for each 64 B half of a 128 B cacheline)
scrub_enable_pmi—fire pmi when scrubbing for a programmed range completes
scrub_range_done—scrubbing for the currently programmed range has completed
scrub_ctr—a scrubbing operation is initiated every 2**CPU clocks
scrub_en—enable the patrol scrubber
scrub_with_user_poison—on a scrub write use a user-defined poison value
scrub_user_poison_val—the poison value to use on a scrub write operation
scrub_with_user_dirbits—on a scrub write use a user-defined dirbits value
scrub_user_dirbits_val—the dirbits value to use on a scrub write operation In an embodiment, the scrub_ctr defaults to 0xffff. Additionally, the currAddr may be set to loAddr unless scrubbing from a location other than the bottom of the range is requested.

Accordingly, in some embodiments, demand or patrol scrubbing proactively clean up soft errors in memory. This in turn reduces the latency penalty of ECC trials on subsequent access of the same location in memory. It also prevents multiple soft errors to accumulate over time. Multiple soft errors may potentially result in the data becoming uncorrectable. Also, the patrol scrubber logic may operate in the system address space; because of this, configuring the logic would be a natural extension of the algorithm employed by the firmware to setup the system address map. Further, the HA may reuse forward progress algorithm(s) to ensure fairness between scrub and fabric requests. On the other hand, if the scrubber logic were implemented using compressed (device-level) addresses, ensuring forward progress becomes much harder and less efficient. This is because a memory controller may have to provide unique forward mechanisms for patrol scrubber requests and HA requests. Since the scrubber is controlled by the HA, it can provide a similar quality of service guarantees for both scrub and fabric requests. Furthermore, in one embodiment, the patrol scrubber log may include a feature that allows system firmware to clean up poison data from memory, as discussed further below. This prevents a fatal error upon use of the poisoned data.

Figure 5:
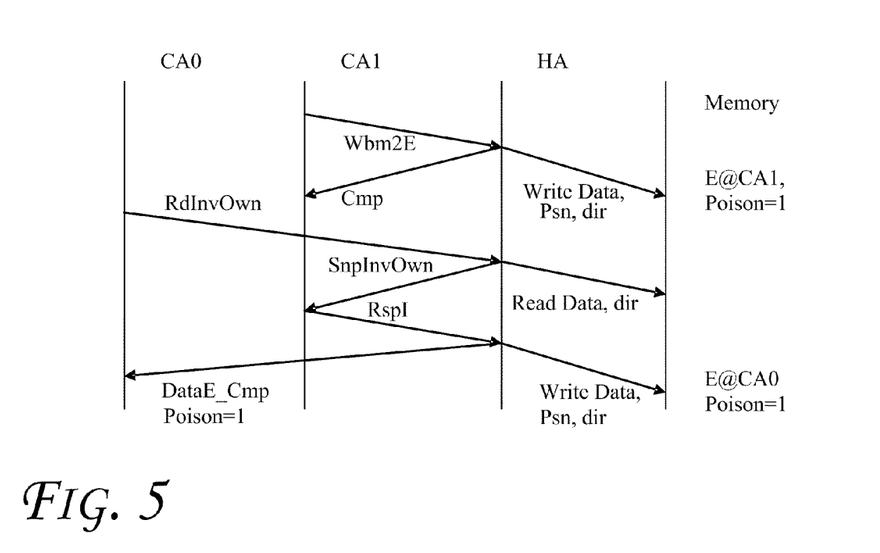
Figure 6:
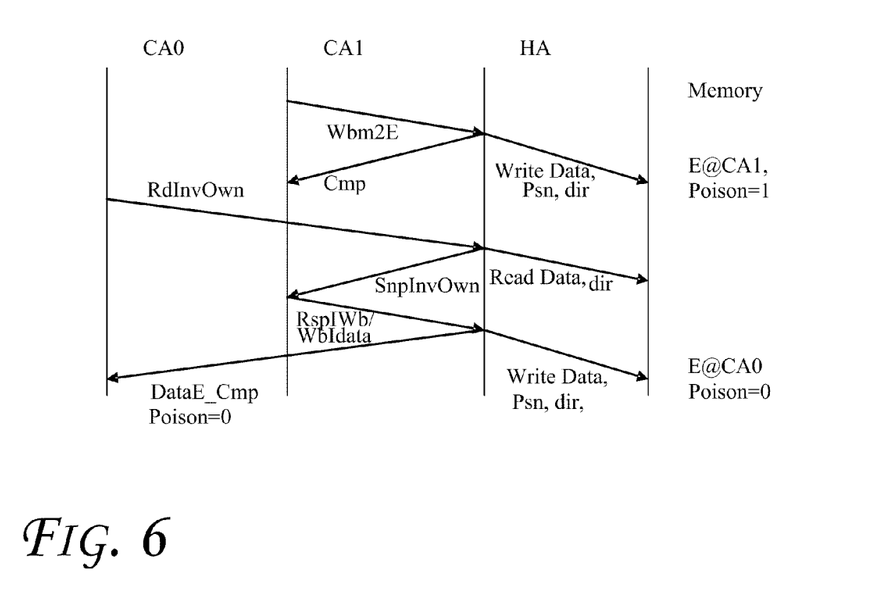

FIGS. 5 and 6 illustrate flow diagrams for storing and propagating poisoned data at a home agent, according to some embodiments. In an embodiment, the home agent maintains poison status bit for a portion of memory, such as one or more bits of the memory (including for example, for a 64 B line boundary). Poison status maintenance and updating may be introduced via one of the following:

(1) Caching agent's writeback to home agent has the poison bit set. In an embodiment, the poison bit is provided in, for example, bit-52 of the data payload flit. The corresponding line or portion of memory is committed to memory using a special directory encoding. This encoding may utilize bit-12 (the 13th bit) of the directory encoding to be set, indicating that the data is poisoned. Note that the lower 12 bits (0-11) of the directory encoding may contain normal MESI/ownership-list information (where MESI respectively refers to Modified, Exclusive, Shared, Invalid memory status). The directory/poison may be maintained in spare-ECC bits in the memory.

(2) Read from memory results in an uncorrected error—in this case, the home agent would send poisoned data to the requestor (assuming the home agent is required to send data, and no writeback to that address is received). Additionally, if the request required a directory update, the home agent would write back the portion of memory (e.g., line) to memory with the poisoned bit set. Note that on a read that results in an uncorrectable error, the directory encodings (in addition to the data) may not be reliable. As a result, the directory controller logic needs to broadcast snoops to all caching agents in the system. During mirroring, however, the home agent would transparently failover the uncorrected read to the mirror home agent as opposed to returning data poisoned.

(3) A read from memory returns a poisoned directory encoding (and no uncorrectable error results). Note that in this case, the directory encoding itself is correct, however, the data may not be reliable. In such a case, the directory controller can use the directory encoding to selectively send snoops. For example, the home agent would send poisoned data to the requestor (assuming the home agent is required to send data, and no writeback to that address is received). During mirroring, however, the home agent would transparently failover the poisoned read to the mirror home agent as opposed to returning the data poisoned in one embodiment. Moreover, it is possible that a line that is fetched uncorrected from memory has its poison bit reset due to a clean writeback (implicit or explicit) to the same address. However, partial writebacks would continue to keep the poison bit set. A coherent line marked poisoned in memory would require a full-line write to clear the poison bit (e.g., using an invitoe/wbmtoi combination, which indicate that the CPU has done a store to a full cache line without first reading it). Additionally, it is possible to use the patrol scrubber logic to selectively clear the poison bit in memory in some embodiments.

Referring to FIG. 5, "CA0" and "CA1" refer to caching agents (which may be one of the agents of FIG. 1 and/or one the components of FIG. 2 such as sockets 202-208 or MC0-MC3, depending on the implementation), "HA" refers to home agent (which may be one of the agents of FIG. 1 and/or one the components of FIG. 2 such as MC0-MC3, depending on the implementation), and "Memory" refers to local or a memory coupled to and managed by HA (such as the memory 120 of FIG. 1 and/or MEM0-MEM3 of FIG. 3).

As illustrated in FIG. 5, CA1 (which may be configured as a node controller or proxy agent) issues a Wbm2E/WbEdata (cache line writeback that retains ownership E) to the HA. This data includes the poison bit set in an embodiment. The HA writes the data to memory, and the directory continues to point to CA1 as the exclusive owner. The poison bit is set. CA0 performs a RdInvOwn of the same address (e.g., a read operation which acquires Exclusive ownership). Since the directory points to CA1 as the owner, the HA sends a SnpInvOwn to CA1 (which sends snoops to invalid ownership in other caching agents, in this example CA1). CA1 has silently cast out the line, so it responds with RspI (indicating response is invalid) to the SnpInvOwn.

Upon receiving the snoop response, the HA sends the data from memory to CA0. Since the poison bit was set, the HA sends poisoned data to CA0. Further, since the new owner of the line is CA0, the HA updates the directory to E@CA0. It continues to keep the poison bit on the data set. CA0 will check if it consumes the data.

Referring to FIG. 6, the following variations from FIG. 5 exist:

(1) Upon receiving the SnpInvOwn, CA1 responds with a full line writeback. The writeback data is no longer poisoned. When the HA receives the non-poisoned data, it proceeds to write it to memory. The directory is updated to E@CA0, further the poison bit is cleared in memory.

(2) The HA sends the data to CA0, the data is no longer poisoned.

Accordingly, an embodiment allows the system to not signal a fatal error upon first encountering an uncorrectable error. Instead, only the process consuming poisoned data needs to be terminated/killed. Further, an embodiment ensures that there is no silent corruption of memory data and/or that no corrupted data would be committed to non-volatile memory (e.g., the non-volatile memory discussed with reference to FIG. 8 or 9).

Figure 7:
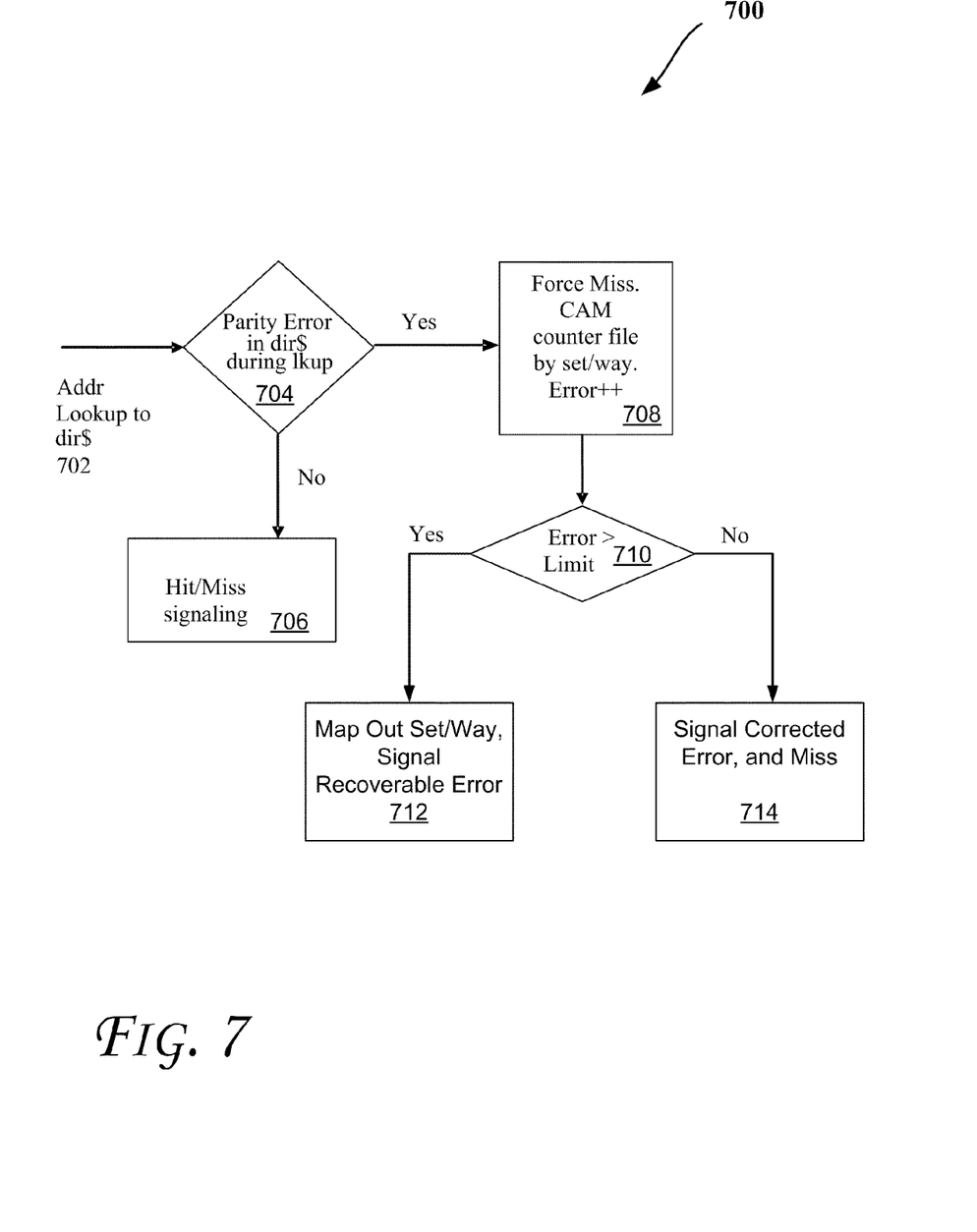

FIG. 7 illustrates a flow diagram of a method 700 to dynamically map out an index/way out of the directory cache, according to an embodiment. In one embodiment, various components discussed with reference to FIGS. 1-2 and 8-9 may be utilized to perform one or more of the operations discussed with reference to FIG. 7. For example, a home agent (or logic within the home agent such as a map out logic in agent 102-1 of FIG. 1, home agent(s) of FIG. 2, components of FIG. 8 or 9, etc.) may perform operations of method 700 in various embodiments.

As shown in FIG. 1, a home agent may include a directory cache (e.g., cache 122) for caching frequently used directory tags (e.g., each directory tag tracks ownership on a 64 B cache line granularity). In an embodiment, the directory may track ownership of up to 64 caching agents including IOH's (Input/Output Hub's as discussed with reference to chipset 806 of FIG. 8 or chipset 920 of FIG. 9, or which may be otherwise coupled to a socket or processor to provide I/O functionality)

and node controller/proxy agents. The directory cache may be a back up (of all or portion) of a full directory that is stored in the memory controlled or accessible by the HA (such as memory 120 of FIG. 1 or MEM0-MEM3 of FIG. 3). For example, cache line requests to the HA may generate a parallel lookup in the directory cache for ownership information.

In some embodiments, the directory tracks one or more of the following for a portion of memory (such as a cache line): invalid lines, exclusive ownership, one exact sharer, and/or multiple sharers via a coarse sharing list. Tracking ownership of cache line (or other portions of memory) via the directory allows directed snoops to a subset of caching agents; thus, reducing the snoop bandwidth demand on the system fabric.

In an embodiment, a logic coupled to the directory cache (not shown) provides a mechanism to dynamically disable cache entries (or other portions) that have become source of hard errors, e.g., due to latent defects. The directory cache storage fields may be parity protected and may detect single bit errors. By proactively disabling cache entries that encounter persistent parity errors, the chance of silent data corruption may be drastically reduced. The directory cache logic may for example disable a plurality (e.g., up to sixteen) of ways, independent of the directory cache index. In an embodiment, a programmable error threshold may determine the number of parity errors that need to occur to cause mapping out of a particular index and/or way from the directory cache. The directory cache logic may also prevent a one-time soft error from unnecessarily occupying one of the (e.g., sixteen) register tracking entries. In some embodiments, the cache array is organized into 8 k sets (split across two physical banks) with 16 ways per set. Each way may hold three fields: a 30 bit tag field and two 12 bit fields that hold the MESI and ownership information of the two 64-byte buddies of a 128 Byte core cache line. Each field may be parity protected in an embodiment.

In an embodiment, the fields (which may implemented as CAM (Content Addressable Memory) may include the following:

| FIELD | DESCRIPTION |
| --- | --- |
| Valid | Indicates the entry is active |
| Index[11:0] | Points to the indexes that have the parity error |
| Bank_bit | Points to the physical bank that has the parity error |
| Way[3:0] | Points to the way in the index that has the parity error |
| Error_Count[2:0] | Indicates the number of parity errors encountered for the index/way combination |

Referring to FIG. 7, upon receipt of an address lookup to the directory cache 702, it may be determined whether a parity error in the directory cache has occurred during lookup 704. If no parity error has occurred, hit/miss signaling occurs at operation 706 (e.g., indicating a hit/miss in a normal fashion). Otherwise, at a operation 708, the CAM registered may be accessed to look for a hit, then the Error_Count [2:0] may be incremented, e.g., up to the programmable threshold as determined at operation 710.

At operation 708, if the entry does not exist in the CAM registers, a new entry is logged in an embodiment. If all entries are full, then the directory cache overflow bit may be asserted. If a parity error is indicated on more than one way, only one error count may be incremented. However, the directory cache may schedule a scrub for each parity error detected. This ensures that a one time soft error will not cause a parity error on a subsequent access. In the event that the CAM has a hit, but the directory cache indicates no parity error (i.e., the original logged entry was a soft error), the error count is decremented by one. Moreover, an error count of zero will in turn invalidate the corresponding CAM register entry. No error count increments or decrements may occur after the entry hits the programmed error threshold in one embodiment. The threshold may default to two in some embodiments.

In an embodiment, the CAM operation is performed in parallel with every directory cache lookup. The directory cache index and bank information may be used in the CAM operation. On a CAM hit, the error count on the entry is compared against the programmed error threshold. If the count equals the threshold at operation, the way held in the CAM entry is treated as disabled. The disable information may be used to mask a hit or allocation to that way. Entries that have hit the threshold will be treated as disabled until the CAM registers are reset on a system state reset. These logs may be read out and reprogrammed after a system state reset to avoid the penalty of rediscovering latent defects.

Referring to FIG. 7, if the number of errors is more than the limit (or threshold), recoverable error may be signaled and the set/way may be mapped out at an operation 712. Otherwise, corrected error may be signals with a miss at operation 714. Accordingly, some embodiments dynamically map out an index/way of the directory cache. Mapping out an index/way may prevent additional latency associated with accessing memory for the directory tags, in part, because of a parity error from a latent defect on the looked up index/way. Such embodiments may also reduce chances of silent data corruption of any index/way in the directory cache.

Figure 8:
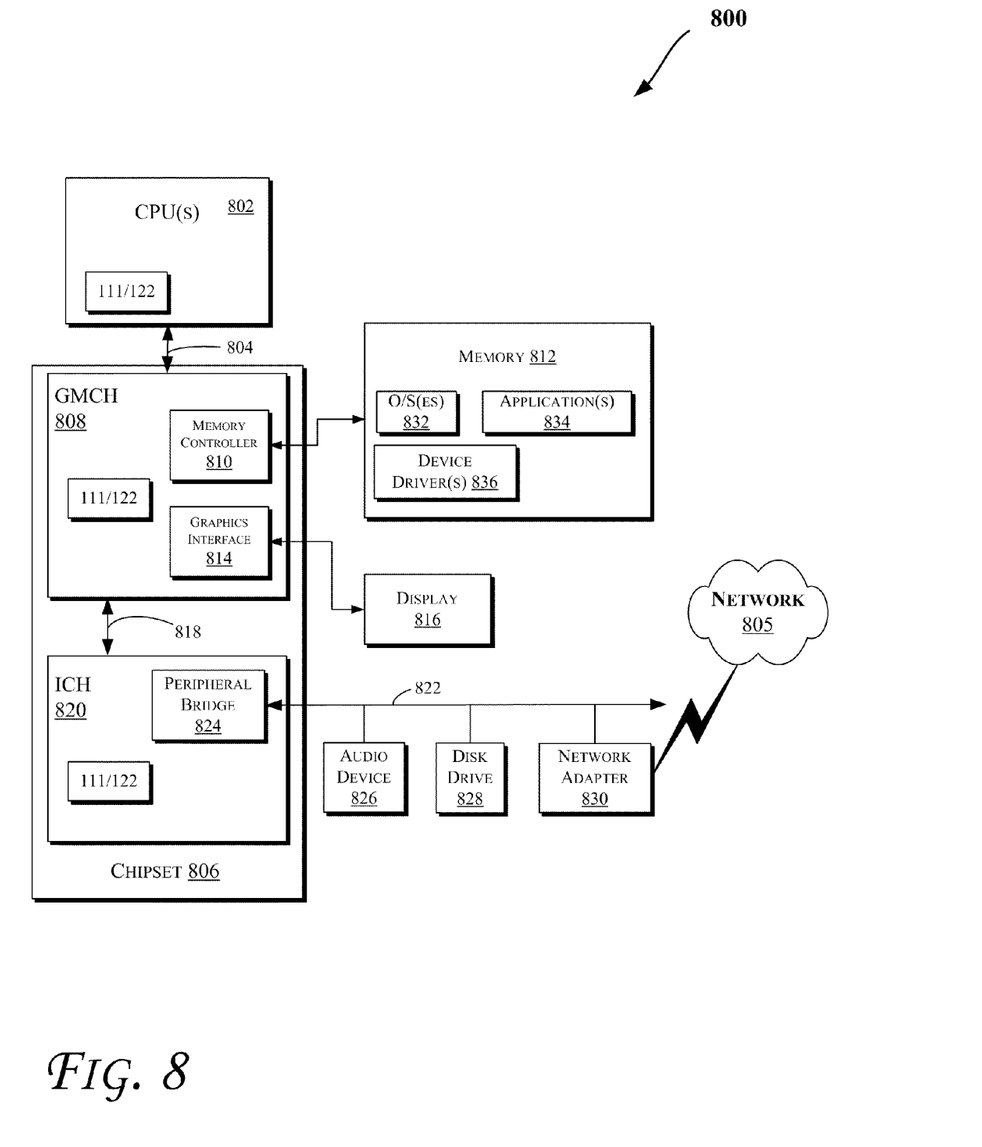

FIG. 8 illustrates a block diagram of an embodiment of a computing system 800. One or more of the agents 102 of FIG. 1 may comprise one or more components of the computing system 800. Also, various components of the system 800 may include a directory cache (e.g., such as directory cache 122 of FIG. 1) and/or a scrubber or map out logic (e.g., logic 111 of FIG. 1) as illustrated in FIG. 8. However, the directory cache and/or scrubber logic may be provided in locations throughout the system 800, including or excluding those illustrated. The computing system 800 may include one or more central processing unit(s) (CPUs) 802 (which may be collectively referred to herein as "processors 802" or more generically "processor 802") coupled to an interconnection network (or bus) 804. The processors 802 may be any type of processor such as a general purpose processor, a network processor (which may process data communicated over a computer network 805), etc. (including a reduced instruction set computer (RISC) processor or a complex instruction set computer (CISC)). Moreover, the processors 802 may have a single or multiple core design. The processors 802 with a multiple core design may integrate different types of processor cores on the same integrated circuit (IC) die. Also, the processors 802 with a multiple core design may be implemented as symmetrical or asymmetrical multiprocessors.

The processor 802 may include one or more caches (e.g., other than the illustrated directory cache 122), which may be private and/or shared in various embodiments. Generally, a cache stores data corresponding to original data stored elsewhere or computed earlier. To reduce memory access latency, once data is stored in a cache, future use may be made by accessing a cached copy rather than refetching or recomputing the original data. The cache(s) may be any type of cache, such a level 1 (L1) cache, a level 2 (L2) cache, a level 3 (L3), a mid-level cache, a last level cache (LLC), etc. to store electronic data (e.g., including instructions) that is utilized by one or more components of the system 800. Additionally, such cache(s) may be located in various locations (e.g., inside other components to the computing systems discussed herein, including systems of FIG. 1, 2, 8, or 9).

A chipset 806 may additionally be coupled to the interconnection network 804. Further, the chipset 806 may include a graphics memory control hub (GMCH) 808. The GMCH 808 may include a memory controller 810 that is coupled to a memory 812. The memory 812 may store data, e.g., including sequences of instructions that are executed by the processor 802, or any other device in communication with components of the computing system 800. Also, in one embodiment of the invention, the memory 812 may include one or more volatile storage (or memory) devices such as random access memory (RAM), dynamic RAM (DRAM), synchronous DRAM (SDRAM), static RAM (SRAM), etc. Nonvolatile memory may also be utilized such as a hard disk. Additional devices may be coupled to the interconnection network 804, such as multiple processors and/or multiple system memories.

The GMCH 808 may further include a graphics interface 814 coupled to a display device 816 (e.g., via a graphics accelerator in an embodiment). In one embodiment, the graphics interface 814 may be coupled to the display device 816 via an accelerated graphics port (AGP). In an embodiment of the invention, the display device 816 (such as a flat panel display) may be coupled to the graphics interface 814 through, for example, a signal converter that translates a digital representation of an image stored in a storage device such as video memory or system memory (e.g., memory 812) into display signals that are interpreted and displayed by the display 816.

As shown in FIG. 8, a hub interface 818 may couple the GMCH 808 to an input/output control hub (ICH) 820. The ICH 820 may provide an interface to input/output (I/O) devices coupled to the computing system 800. The ICH 820 may be coupled to a bus 822 through a peripheral bridge (or controller) 824, such as a peripheral component interconnect (PCI) bridge that may be compliant with the PCIe specification, a universal serial bus (USB) controller, etc. The bridge 824 may provide a data path between the processor 802 and peripheral devices. Other types of topologies may be utilized. Also, multiple buses may be coupled to the ICH 820, e.g., through multiple bridges or controllers. Further, the bus 822 may comprise other types and configurations of bus systems. Moreover, other peripherals coupled to the ICH 820 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), etc.

The bus 822 may be coupled to an audio device 826, one or more disk drive(s) 828, and a network adapter 830 (which may be a NIC in an embodiment). In one embodiment, the network adapter 830 or other devices coupled to the bus 822 may communicate with the chipset 806. Also, various components (such as the network adapter 830) may be coupled to the GMCH 808 in some embodiments of the invention. In addition, the processor 802 and the GMCH 808 may be combined to form a single chip. In an embodiment, the memory controller 810 may be provided in one or more of the CPUs 802. Further, in an embodiment, GMCH 808 and ICH 820 may be combined into a Peripheral Control Hub (PCH).

Additionally, the computing system 800 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 828), a floppy disk, a compact disk ROM (CD-ROM), a digital versatile disk (DVD), flash memory, a magneto-optical disk, or other types of nonvolatile machine-readable media capable of storing electronic data (e.g., including instructions).

The memory 812 may include one or more of the following in an embodiment: an operating system (O/S) 832, application 834, directory 801, and/or device driver 836. The memory 812 may also include regions dedicated to Memory Mapped I/O (MMIO) operations. Programs and/or data stored in the memory 812 may be swapped into the disk drive 828 as part of memory management operations. The application(s) 834 may execute (e.g., on the processor(s) 802) to communicate one or more packets with one or more computing devices coupled to the network 805. In an embodiment, a packet may be a sequence of one or more symbols and/or values that may be encoded by one or more electrical signals transmitted from at least one sender to at least on receiver (e.g., over a network such as the network 805). For example, each packet may have a header that includes various information which may be utilized in routing and/or processing the packet, such as a source address, a destination address, packet type, etc. Each packet may also have a payload that includes the raw data (or content) the packet is transferring between various computing devices over a computer network (such as the network 805).

In an embodiment, the application 834 may utilize the O/S 832 to communicate with various components of the system 800, e.g., through the device driver 836. Hence, the device driver 836 may include network adapter 830 specific commands to provide a communication interface between the O/S 832 and the network adapter 830, or other I/O devices coupled to the system 800, e.g., via the chipset 806.

In an embodiment, the O/S 832 may include a network protocol stack. A protocol stack generally refers to a set of procedures or programs that may be executed to process packets sent over a network 805, where the packets may conform to a specified protocol. For example, TCP/IP (Transport Control Protocol/Internet Protocol) packets may be processed using a TCP/IP stack. The device driver 836 may indicate the buffers in the memory 812 that are to be processed, e.g., via the protocol stack.

The network 805 may include any type of computer network. The network adapter 830 may further include a direct memory access (DMA) engine, which writes packets to buffers (e.g., stored in the memory 812) assigned to available descriptors (e.g., stored in the memory 812) to transmit and/or receive data over the network 805. Additionally, the network adapter 830 may include a network adapter controller, which may include logic (such as one or more programmable processors) to perform adapter related operations. In an embodiment, the adapter controller may be a MAC (media access control) component. The network adapter 830 may further include a memory, such as any type of volatile/nonvolatile memory (e.g., including one or more cache(s) and/or other memory types discussed with reference to memory 812).

Figure 9:
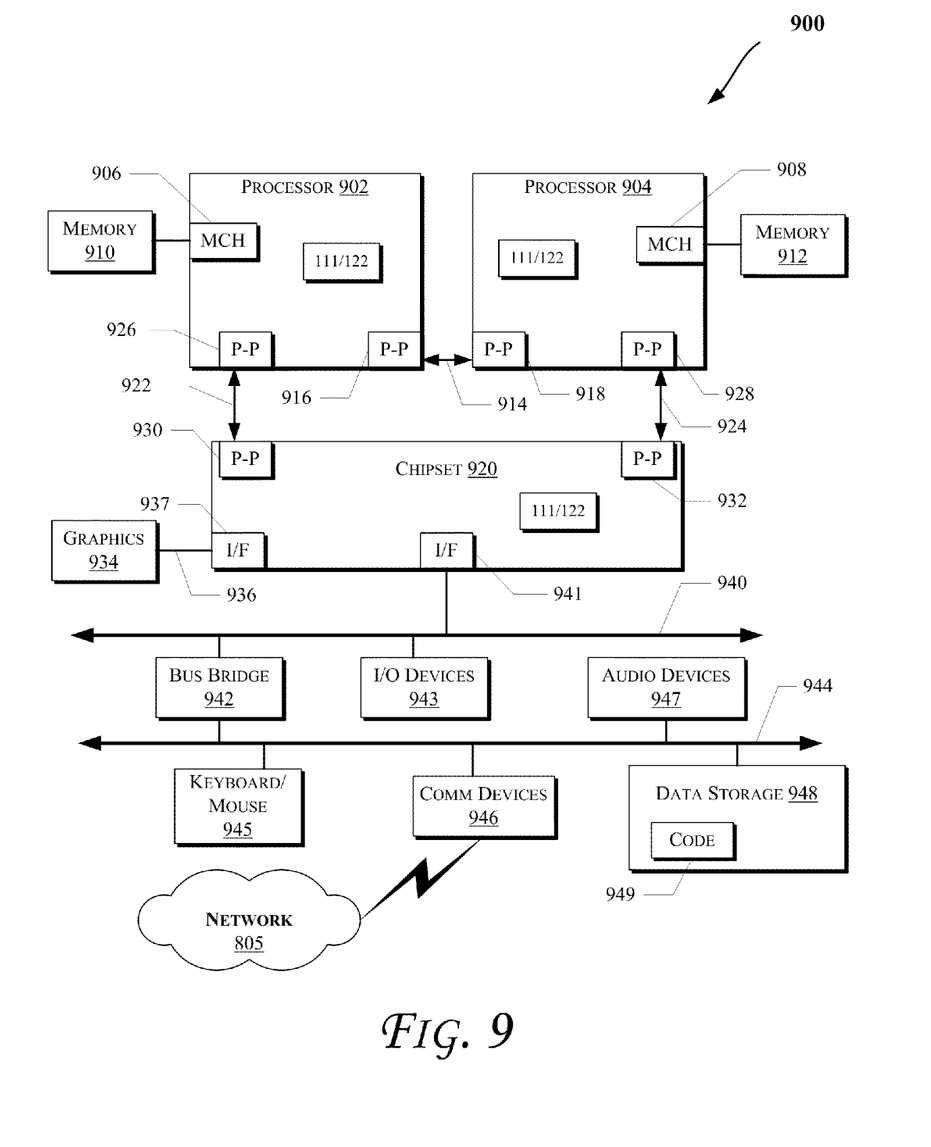

FIG. 9 illustrates a computing system 900 that is arranged in a point-to-point (PtP) configuration, according to an embodiment of the invention. In particular, FIG. 9 shows a system where processors, memory, and input/output devices are interconnected by a number of point-to-point interfaces. The operations discussed with reference to FIGS. 1-8 may be performed by one or more components of the system 900.

As illustrated in FIG. 9, the system 900 may include several processors, of which only two, processors 902 and 904 are shown for clarity. The processors 902 and 904 may each include a local memory controller hub (GMCH) 906 and 908 to enable communication with memories 910 and 912. The memories 910 and/or 912 may store various data such as those discussed with reference to the memory 912 of FIG. 9. As shown in FIG. 9, the processors 902 and 904 (or other components of system 900 such as chipset 920, I/O devices 943, etc.) may also include one or more cache(s) such as those discussed with reference to FIGS. 1-8.

In an embodiment, the processors 902 and 904 may be one of the processors 902 discussed with reference to FIG. 9. The processors 902 and 904 may exchange data via a point-to-point (PtP) interface 914 using PtP interface circuits 916 and 918, respectively. Also, the processors 902 and 904 may each exchange data with a chipset 920 via individual PtP interfaces 922 and 924 using point-to-point interface circuits 926, 928, 930, and 932. The chipset 920 may further exchange data with a high-performance graphics circuit 934 via a high-performance graphics interface 936, e.g., using a PtP interface circuit 937.

In at least one embodiment, a directory cache and/or scrubber logic may be provided in one or more of the processors 902, 904 and/or chipset 920. Other embodiments of the invention, however, may exist in other circuits, logic units, or devices within the system 900 of FIG. 9. Furthermore, other embodiments of the invention may be distributed throughout several circuits, logic units, or devices illustrated in FIG. 9. For example, various components of the system 900 may include a directory cache (e.g., such as directory cache 122 of FIG. 1) and/or a scrubber or map out logic (e.g., logic 111 of FIG. 1). However, the directory cache and/or scrubber logic may be provided in locations throughout the system 900, including or excluding those illustrated.

The chipset 920 may communicate with the bus 940 using a PtP interface circuit 941. The bus 940 may have one or more devices that communicate with it, such as a bus bridge 942 and I/O devices 943. Via a bus 944, the bus bridge 942 may communicate with other devices such as a keyboard/mouse 945, communication devices 946 (such as modems, network interface devices, or other communication devices that may communicate with the computer network 905), audio I/O device, and/or a data storage device 948. The data storage device 948 may store code 949 that may be executed by the processors 902 and/or 904.

In various embodiments of the invention, the operations discussed herein, e.g., with reference to FIGS. 1-9, may be implemented as hardware (e.g., circuitry), software, firmware, microcode, or combinations thereof, which may be provided as a computer program product, e.g., including a machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-9. Additionally, such computer-readable media may be downloaded as a computer program product, wherein the program may be transferred from a remote computer (e.g., a server) to a requesting computer (e.g., a client) through data signals provided in a carrier wave or other propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
a first agent to receive a request, corresponding to a target address, from a second agent;
a directory cache, coupled to the first agent, to store data corresponding to a plurality of caching agents coupled to the first agent;
a memory coupled to the first agent to store data corresponding to the request;
a scrubber logic to correct an error at a location in the memory corresponding to the target address; and
a content addressable memory to store, for each entry of the directory cache, one or more of: a validity field, an index field, a bank field, a way field, and an error count field.

2. The apparatus of claim 1, wherein the first agent is to write a corrected version of the data, corresponding to the request, at the location in the memory corresponding to the target address.

3. The apparatus of claim 1, wherein error correction code is to correct the error during access to the memory.

4. The apparatus of claim 1, wherein the request corresponds to a plurality of target addresses and the scrubber logic is to access a plurality of locations in the memory corresponding to the plurality of target addresses.

5. The apparatus of claim 1, wherein the first agent is to comprise the scrubber logic.

6. The apparatus of claim 1, wherein the first agent is to update the directory cache in response to one or more snoop responses received from one or more of the plurality of caching agents.

7. The apparatus of claim 1, wherein the first agent is to send one or more snoops to one or more of the plurality of caching agents identified by the directory cache to have a copy of the data corresponding to the target address.

8. The apparatus of claim 1, wherein the first agent is a home agent of the target address.

9. The apparatus of claim 1, further comprising a serial link to couple the first agent and second agent.

10. The apparatus of claim 1, wherein the first agent and second agent are on a same integrated circuit die.

11. The apparatus of claim 1, wherein the memory is to store one or more poison bits to indicate whether one or more corresponding portions of the memory store data with uncorrectable errors.

12. An apparatus comprising:
a first agent to receive a request, corresponding to a target address, from a second agent;
a directory cache, coupled to the first agent, to store data corresponding to a plurality of caching agents coupled to the first agent;
a memory coupled to the first agent to store data corresponding to the request;
a map out logic to map out an index or way of the directory cache in response to a number of errors, corresponding to the directory cache, exceeding a threshold value; and
a content addressable memory to store, for each entry of the directory cache, one or more of: a validity field, an index field, a bank field, a way field, and an error count field.

13. The apparatus of claim 12, wherein the first agent is to update the directory cache in response to one or more snoop responses received from one or more of the plurality of caching agents.

14. The apparatus of claim 12, wherein the first agent is to comprise the map out logic.

15. The apparatus of claim 12, wherein the first agent is to send one or more snoops to one or more of the plurality of caching agents identified by the directory cache to have a copy of the data corresponding to the target address.

16. The apparatus of claim 12, wherein the first agent is a home agent of the target address.

17. The apparatus of claim 12, further comprising a serial link to couple the first agent and second agent.

18. The apparatus of claim 12, wherein the first agent and the second agent are on a same integrated circuit die.

19. The apparatus of claim 12, wherein the memory is to store one or more poison bits to indicate whether one or more corresponding portions of the memory store data with uncorrectable errors.

20. A method comprising:
receiving a request, corresponding to a target address, at a first agent; and
storing data corresponding to a plurality of caching agents, coupled to the first agent, in a directory cache;
storing data corresponding to the request in a memory;
correcting an error at a location in the memory, corresponding to the target address, based on the first agent writing a corrected version of the data, corresponding to the request, at the location in the memory corresponding to the target address; and
storing in a content addressable memory, for each entry of the directory cache, one or more of: a validity field, an index field, a bank field, a way field, and an error count field.

21. The method of claim 20, wherein the request corresponds to a plurality of target addresses and correcting the error is to comprise accessing a plurality of locations in the memory corresponding to the plurality of target addresses.

22. The method of claim 20, wherein correcting the error is to comprise error correction code correcting the error during access to the memory.

23. The method of claim 20, further comprising storing data in the directory cache to indicate which one of the plurality of caching agents has a copy of the data corresponding to the target address.

24. The method of claim 20, further comprising updating the directory cache in response to one or more snoop responses received from one or more of the plurality of caching agents.

25. A system comprising:
a memory to store a directory;
a first agent to receive a request, corresponding to a target address in the memory, wherein the memory is to store data corresponding to the request;

a directory cache, coupled to the first agent, to store data corresponding to a plurality of caching agents coupled to the first agent, wherein the stored data in the directory cache is to indicate which one of the plurality of caching agents has a copy of the data corresponding to the target address, wherein the first agent is to comprise at least one of:

a scrubber logic to correct an error at a location in the memory corresponding to the target address; or a map out logic to map out an index or way of the directory cache in response to a number of errors, corresponding to the directory cache, exceeding a threshold value; and a content addressable memory to store, for each entry of the directory cache, one or more of: a validity field, an index field, a bank field, a way field, and an error count field.

26. The system of claim 25, wherein the first agent is to write a corrected version of the data, corresponding to the request, at the location in the memory corresponding to the target address.

27. The system of claim 25, wherein error correction code is to correct the error during access to the memory.

28. The system of claim 25, wherein the memory is to store one or more poison bits to indicate whether one or more corresponding portions of the memory store data with uncorrectable errors.

29. A method comprising:
receiving a request, corresponding to a target address, at a first agent; and
storing data corresponding to a plurality of caching agents, coupled to the first agent, in a directory cache;
storing data corresponding to the request in a memory;
mapping out an index or way of the directory cache in response to a number of errors, corresponding to the directory cache, exceeding a threshold value; and
storing in a content addressable memory, for each entry of the directory cache, one or more of: a validity field, an index field, a bank field, a way field, and an error count field.

30. The method of claim 29, wherein mapping out an index or way of the directory cache is to be performed by logic at the first agent.

31. The method of claim 29, further comprising correcting an error at a location in the memory, corresponding to the target address, based on the first agent writing a corrected version of the data, corresponding to the request, at the location in the memory corresponding to the target address.

32. The method of claim 31, wherein correcting the error is to comprise error correction code correcting the error during access to the memory.

33. The method of claim 29, wherein the request corresponds to a plurality of target addresses.

34. The method of claim 29, further comprising storing data in the directory cache to indicate which one of the plurality of caching agents has a copy of the data corresponding to the target address.

35. The method of claim 29, further comprising updating the directory cache in response to one or more snoop responses received from one or more of the plurality of caching agents.

* * * * *